(No Model.)
N. STEDMAN.
DISINTEGRATOR.
No. 518,010. Patented Apr. 10, 1894.
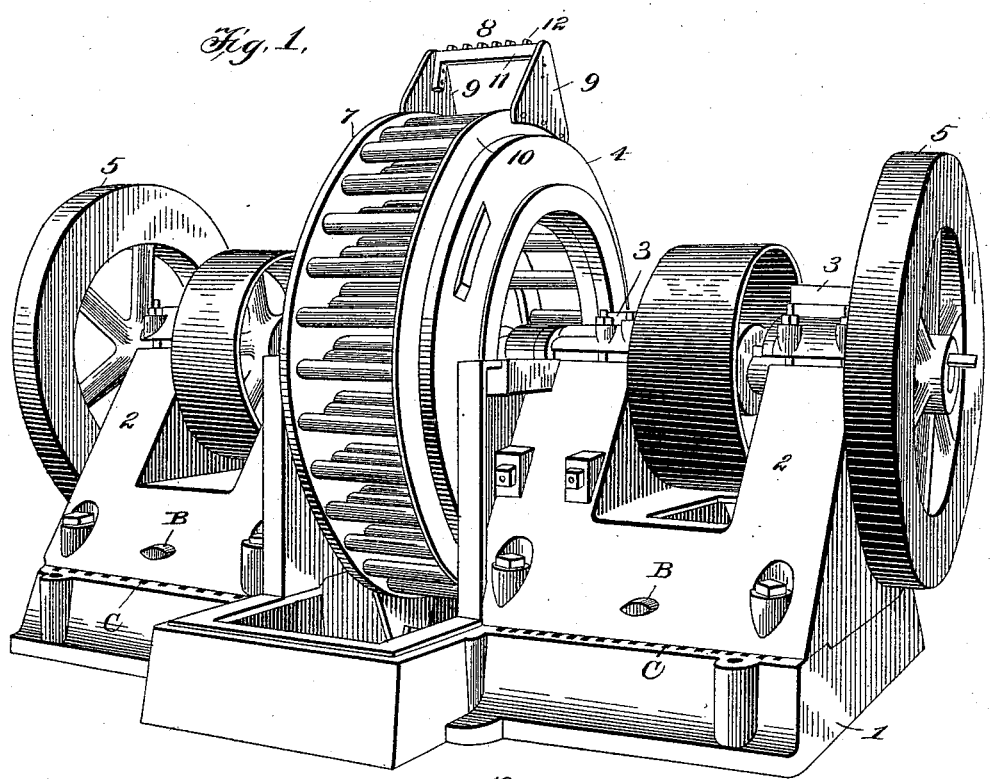
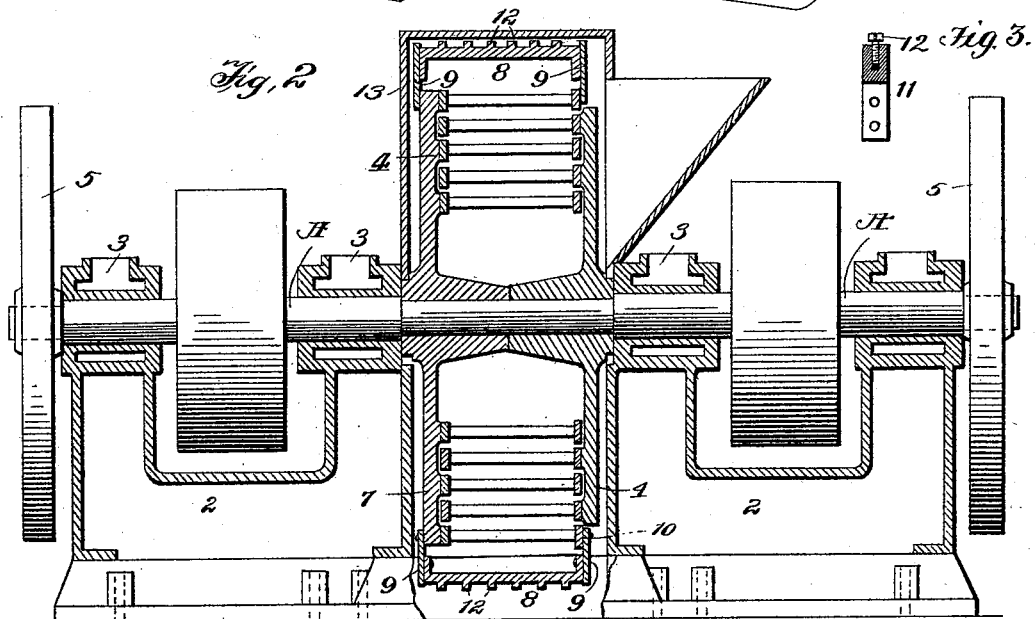
Witnesses:
Harry B. Rohrer
R. M. Elliott
Inventor:
Nathan Stedman
By Davis & Co.
Attys.
THE NATIONAL LITHOGRAPHING COMPANY,
WASHINGTON, D. C.

United States Patent Office.

NATHAN STEDMAN, OF AURORA, INDIANA, ASSIGNOR TO THE STEDMAN'S FOUNDRY AND MACHINE WORKS, OF SAME PLACE.

DISINTEGRATOR.

SPECIFICATION forming part of Letters Patent No. 518,010, dated April 10, 1894.

Application filed August 8, 1893. Serial No. 482,655. (No model.)

*To all whom it may concern:*

Be it known that I, NATHAN STEDMAN, a citizen of the United States, residing at Aurora, in the county of Dearborn and State of Indiana, have invented a certain new, useful, and valuable Improvement in Disintegrators, of which the following is a full, clear, and exact description.

This invention relates to an improvement in disintegrators, such as are employed in disintegrating or pulverizing ores, clay, or other substances, and more particularly to that class in which a plurality of revoluble cages are employed.

The object of the invention is to provide a disintegrator employing double disintegrating cages one of which cages is provided on its periphery with a scraper designed to work close to or in contact with the interior of the casing covering the cages, whereby to prevent any material from clogging within the casing or adhering thereto.

With these objects in view the invention consists broadly in a double cage disintegrator having the periphery of the outer cage provided with a scraper or with scrapers designed to dislodge any substance which might adhere to the interior of the casing.

The invention further consists in the novel construction and combination of parts of a scraper, as will be hereinafter fully described and claimed.

In the accompanying drawings forming a part of this specification, and in which like numerals and letters of reference indicate corresponding parts, Figure 1, is a perspective view of a double cage disintegrator, showing my improved scraper in position on one of the cages. Fig. 2, is a transverse sectional view through the disintegrator with the casing placed thereon, showing the relation the scraper bears to the casing. Fig. 3 is a detail view of the scraper bar in cross section showing the set screw or adjustable scraper tooth.

Referring to the drawings, 1 designates the base of the machine, 2 housings located thereon and having their upper portions provided with journal boxes 3, A transverse shafts journaled in the said boxes and carrying at their inner ends the cages 4 and at their outer ends fly wheels 5. As these portions of the machine may be of any preferred construction, and as they form no part of the subject matter of the present invention, a detailed description is unnecessary.

Secured to the periphery of the outer revolving cylinder 7 are the scrapers 8. But two scrapers are shown in this instance, but it is to be understood that a greater or less number may be employed if desired. Each of the scrapers consists of two plates 9 which are securely bolted to the side of the rim 10 of the cage, and a cross bar 11 firmly secured to the top portion of the plates. The cross bar is provided with a series of set screws 12 which can be moved in or out so as to be brought into close contact with the interior of the casing 13, and these screws, plates 9, and cross bar 11 serve effectually to dislodge any substance which may become clogged within the casing, or which might adhere thereto.

It is to be understood that although I have shown but one form of scraper that I do not wish to be limited to such exact construction, as various other forms may be employed for the same purpose. The housings 2 are adjustable on the base, the latter being provided with a series of openings C along its edge and the housings with projections B to form fulcra for a lever (not shown) by means of which the adjustment of the said housings is effected. These features form the subject matter of an application for patent filed by me of an even date herewith, Serial No. 482,656.

Having thus fully described my invention, what I claim as new, and desire to secure by Letters Patent, is—

1. In a disintegrator, the combination with the cages and a casing inclosing the same, of a scraper bar projecting beyond the periphery of the outer cage, and set screws, or teeth, adjustably connected with the outer edge of the said scraper bar, substantially as and for the purpose specified.

2. In a disintegrator, the combination with the cages and a casing inclosing the same, of plates attached at their inner ends to the outer cage and projecting beyond the periphery thereof, a scraper bar connecting the outer ends of the said plates, and set screws constituting scraping teeth adjustably connected with the scraper bar, substantially as described for the purpose specified.

In testimony whereof I affix my signature in presence of two witnesses.

NATHAN STEDMAN.

Witnesses:
G. M. STEDMAN,
W. R. STEDMAN.